United States Patent [19]

Tatyrek

[11] 4,086,183

[45] Apr. 25, 1978

[54] HEAT STABLE COLORED CHEMILUMINESCENT COMPOSITIONS

[76] Inventor: Alfred F. Tatyrek, 27 Orchard Rd., Maplewood, N.J. 07040

[21] Appl. No.: 699,570

[22] Filed: Jun. 24, 1976

[51] Int. Cl.$^2$ .............................................. C09K 3/00
[52] U.S. Cl. .............................. 427/157; 252/301.16; 252/188.3 CL
[58] Field of Search ............... 252/188.3 CL, 301.2 R; 427/157

[56] References Cited

U.S. PATENT DOCUMENTS 3,753,919  8/1973  Cline .......................... 252/188.3 CL Primary Examiner—Stephen J. Lechert, Jr.
Attorney, Agent, or Firm—Nathan Edelberg; Harold H. Card, Jr.; A. Victor Erkkila

[57] ABSTRACT

An improved process of generating visible yellow, orange, red light from the visible violet, blue, green light produced by a selected tetraaminoethylene and oxygen reaction wherein the improvement comprises first uniformly applying a selected fluorescent dye on a selected substrate having a relative permitivity in excess of 3 and less than 96, and then uniformly applying the selected tetraaminoethylene on the selected substrate.

23 Claims, No Drawings

HEAT STABLE COLORED CHEMILUMINESCENT COMPOSITIONS

GOVERNMENTAL INTEREST

The invention described herein may be manufactured, used, and licensed by or for the Government for governmental purposes without the payment to me of any royalty thereon.

BACKGROUND OF THE INVENTION

The chemiluminescent compound, tetrakis(dimethylamino)ethylene which will hereinafter be referred to as TMAE, has been more extensively used than its analogs, was first reported by Pruett, et al., Journal of the American Chemical Society, 72, 3646 (1950). It is a clear and highly stable water insoluble liquid boiling at 200° C. and freezing at 0° C. Upon exposure to air or oxygen at room temperatures it undergoes an auto-oxidation which is accompanied by a chemiluminescence in the violet-blue-green region as per the following chemical reaction.

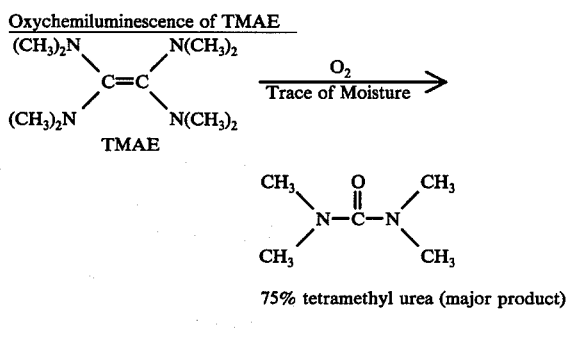

Further, U.S. Pat. No. 3,264,221 of Hilmer E. Winberg teaches improved sources of chemical light from new formulations containing TMAE, and that N, N, N', N'-tetramethylurea and N, N, N', N'-tetramethyloxamide are extremely effective agents in stopping the evolution of light during the oxidation of TMAE.

The practical application of TMAE and its analogs in the fabrication of a sandwich-like structure commonly referred to as a chemiluminescent panel marker or tape is more fully disclosed in U.S. Pat. No. 3,239,406, *Chemiluminescent Structures and their Preparation*, of Donald D. Coffman and Hilmer E. Winberg, dated 8 Mar. 1966.

Until now, it has not been possible to make useful, thermally stable, colored, chemiluminescent formulations of TMAE other than those formulations emitting the characteristic violet, blue, green colored light radiations of TMAE.

The problem of converting the violet-blue-green light of TMAE to a yellow, orange, red light has existed since the discovery of TMAE in 1950.

In the past this problem could not be satisfactorily overcome for the following reasons:

a. chemiluminescing TMAE produces approximately two photons of violet, blue, green light per the reaction of ten thousand molecules of TMAE with a stoichiometric quantity of oxygen;

b. chemiluminescing TMAE produces appreciably less than two photons of red, orange, yellow light per ten thousand molecules of TMAE reacting with oxygen.

c. when the light, generated as per a) and b) above, impinged on a selected substrate to which there had been applied a uniform layer of a conventional yellow, orange, red material or dye; the shorter (green, blue, violet), higher energy wavelengths were absorbed by the conventionally colored material and only the red, orange, yellow light emitted by the chemiluminescing TMAE were reflected by the material colored with a conventional non-fluorescent dye.

If the fluorescent rhodamine dyes and compositions of fluorescent rhodamine dyes were employed as color converters with TMAE containing formulations, the fluorescent rhodamine dyes faded upon storage. If the foregoing storage were heated, the fluorescent rhodamine dyes faded more rapidly.

The Methine and Polymethine Colouring Matters having the following identification and structure[1]:

[1] As described in Color Index[2], American Association of Textile Chemists & Colorists, P.O. Box 12215 Research Triangle Park, North Carolina 27709 Volume 4, third edition, pages 4437 through 4440

[2] [Color Index. A numbered list of synthetic dyestuffs and inorganic pigments compiled by the Society of Dyers and Colourists (Yorkshire, England), which gives the scientific and commercial names, components, formulas, methods of preparation, discovers, literature references, and descriptions of properties and methods of application; 2d ed., 1958 (American Association of Textile Chemists and colorists, Lowell, Mass.) per page 170 of Hackh's Chemical Dictionary]

48010    Basic Dye
(CI Constitution No.)

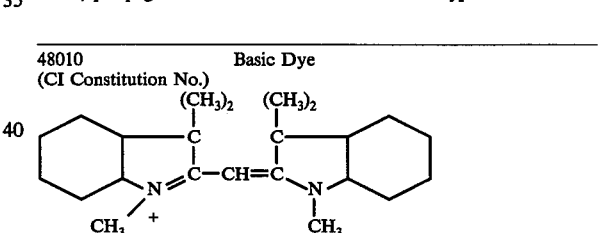

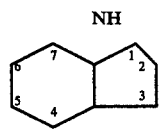

Analogous ring numbering sequence of indole

Basic chloride of bis(1 methyl-3,3 dimethyl-2 indole)methene [hereinafter 48010], 48013    CI Basic Violet 16 (bright bluish red)
(CI Constitution No.)

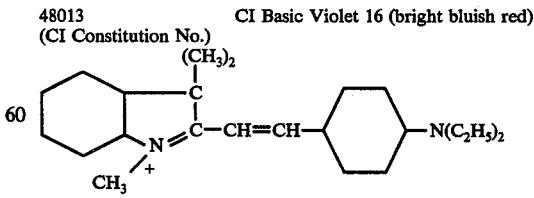

Basic chloride of 1-(1 methyl-3,3 dimethyl-2-indolyl)-2[4(N,N-diethylaminobenzene)]ethylene [hereinafter 48013]

48035    CI Basic Orange 21
(CI Constitution No.)

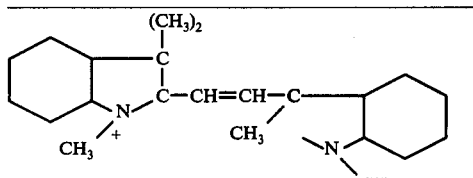

Basic chloride of 1-(1 methyl-3,3 dimethyl-2 indolyl), 2(1,2 dimethyl-3-indolyl) ethylene, 48040            CI basic Orange 22 (bright orange)
(CI Constitution No.)

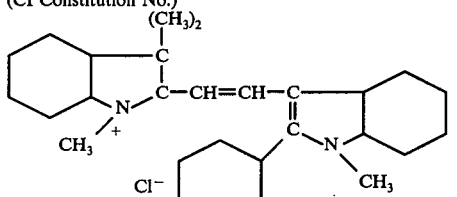

Basic chloride of 1(1 methyl-3,3 dimethyl-2-indolyl), 2(1 methyl-2 benzo-3 indolyl) ethylene, 48070            CI Basic Red 12 (bluish pink)
(CI Constitution No.)

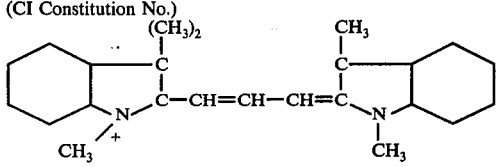

Basic chloride of 1(1 methyl-3,3 dimethyl-2 indolyl), 3(1,3 dimethyl-2 indolyl) propyldiene 1,3, 48015            CI Basic Red 13
(CI Constitution No.)

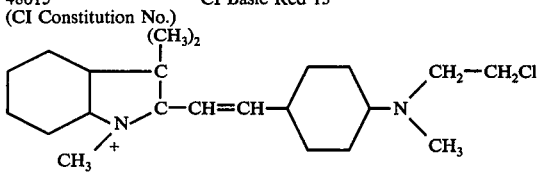

Basic chloride of 1(1 methyl-3,3 dimethyl-2 indolyl), 2[4(N3 chloroethyl, N methyl amino) benzene] ethylene, CI Basic Red 14
Chemical Class: Cyanine
Bright Red (fluorescent),
and the flourescent rhodamine dyes having the following identification and structure:

Rhodamine B, 45170B

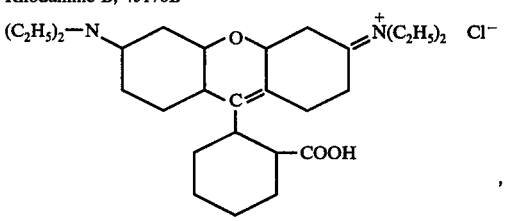

Rhodine 2 G, (SCI) 45165

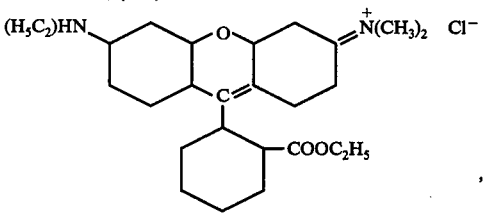

Rhodamine 4 G, (IG) 45166

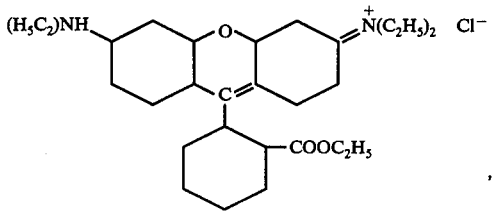

, and

Rhodamin 6 G, 45160

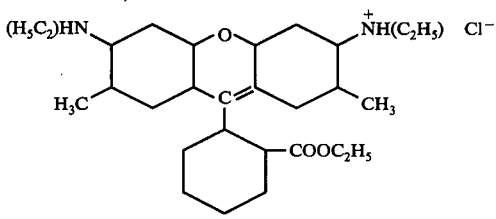

do not react with or are not soluble in TMAE and have been found to be particularly well suited to practice this invention.

It is not known by the inventor whether other hemicyanine, methine, or polymethine fluorescent dyes or other rhodamine fluorescent dyes reacted with or were not soluble in TMAE and whether these other hemicyanine, methine or polymethine dyes or other rhodamine fluorescent dyes are well suited to practice this invention.

SUMMARY OF THE INVENTION

The present invention relates to a chemiluminescent structure, its preparation, and the conversion of the violet-blue-green light of a selected chemiluminescing tetraaminoethylene to orange, red, or yellow light which invention comprises, in the absence of oxygen; air; mixtures of air and oxygen; oxygen with other suitable diluent gases (e.g. nitrogen); peroxides, both organic and inorganic, including aqueous solutions of hydrogen peroxide; first uniformly applying a selected fluorescent dye on a selected substrate having a relative permittivity in excess of 3 and less than 96 and then uniformly applying the selected tetraaminoethylene on the selected substrate in a manner such that at any time after the foregoing preparation of the chemiluminescent structure, it may be exposed to air and/or an oxygen containing ambience whereby the tetraaminoethylene of the chemiluminescent structure reacts with the ambient oxygen to generate visible light which illuminates the fluorescent dye causing it to reflect and radiate visible orange, red, or yellow light.

DESCRIPTION OF THE PREFERRED EMBODIMENTS

In what follows, examples are submitted to illustrate the invention.

It has been found that to practice this invention it is necessary that the selected substrate, alone, or when combined with solvents (e.g. water, ethylene carbonate), possess a relative permittivity (i.e. the ratio of the capacitance of a capacitor, when the dielectric is the substance under investigation and air) in excess of 3 and less than 96. 80, being between 3 and 96, is the relative permittivity of distilled water. In this patent application; dielectric constant, permittivity, relative permittivity are used interchangeably to mean relative permittivity as defined on page 211 of Hackh's Chemical Dictionary, 4th Edision completely revised and edited by Julius Grant, Copyright renewed 1972, McGraw-Hill.

Applicant herewith defines the word, tetraaminoethylene, in this application (hereinafter TAE) to be a generic word denoting a chemiluminescent material selected from the group consisting essentially of tetrakis(dimethyl amino)ethylene (TMAE); tetrakis N-(pyrrolidinyl) ethylene; 1,3'-diethyl-1,'3-dimethyl-Δ2,2'-bi(imidazolidine); 1,1,'3,3'-tetra-n-propyl-Δ2,2'-bi(imidazolidine); 1,1,'3,3'-tetramethyl-Δ2,2'-bi(imidazolidine); 1,1',3,3'-tetraethyl-Δ2,2'-bi(imidazolidine) and 1,1,'3,3'-tetramethyl-Δ2,2'-bi(hexahydropyrimidine).

A diagrammatic chemical representation of the seven foregoing tetraaminoethylenes is as follows:

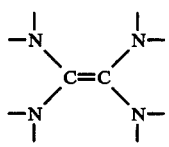

tetrakis(dimethylamino)ethylene (TMAE),

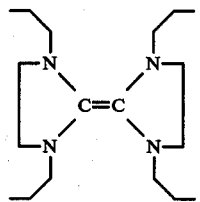

1,1',3,3'-tetra-n-propyl-Δ2,2'-bi(imidazolidine) (PIA),

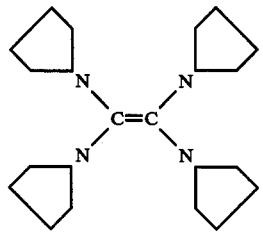

tetrakis N-(pyrrolidinyl) ethylene (TPE),

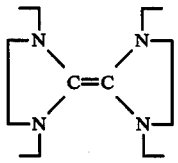

1,1',3,3'-tetraethyl-Δ2,2'-bi(imidazolidine) (MIA),

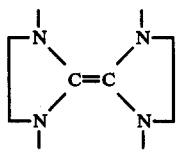

1,1',3,3'-tetramethyl-Δ2,2'-bi(imidazolidine) (MIA),

-continued

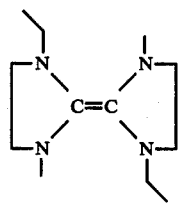

1,3'-diethyl-1'-3-dimethyl-Δ2,2'-bi(imidazolidine) (EMIA), and

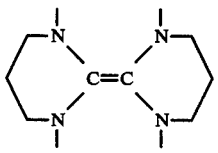

1,1',3,3'-tetramethyl-Δ2,2'-bi(hexahydropyrimidine (MHP).

By the process of this invention, the conversion of the violet, blue, and green light of the chemiluminescing tetraaminoethylene to yellow, orange, or red light is made possible. When tetraaminoethylene chemiluminesces, violet, blue, green, yellow, orange, and red light is emitted. The yellow, orange, and red light emitted is a very small portion of the total (violet, blue, green, yellow, orange, and red) light emitted and the yellow, orange, or red light is reflected from the fluorescent rhodamine dye molecules in much the same manner as light is reflected by a conventional dye or a conventional colored material. However, the green, blue and violet light radiations of the chemiluminescing TMAE illuminating the fluorescent dye cause it to radiate unpolarized yellow, orange, or red light.

Applicant determined that the fading of the fluorescent rhodamine dye upon storage or heated storage conditions could be prevented by the use of a substrate consisting of material selected from the group consisting of succinonitrile, polyacrylonitrile (Creslan or Orlon), polyamides (nylon), polyester (Dacron), or by an incorporation with the substrate of a quantity of dielectric constant material selected from the group consisting of water, ethylene carbonate, propylene carbonate, dimethyl formamide, formamide, dimethyl acetamide, succinonitrile, glycerol, hydrocyanic acid, hydrazine, ammonia, polyacrylonitrile (Creslan or Orlon), polyamides (nylon), polyester (Dacron), such that the resulting relative permittivity of the substrate alone or when combined with the aforementioned dielectric constant material is greater than 3 and less than 96.

Applicant further discovered that the polymeric (a generic term signifying polyacrylonitrile, polyamides, polyester) substrates chosen containing rhodamine and other fluorescent type dyes should be chemically resistant to the high basisity of TMAE and that to effectuate this requirement, polymers containing halogens, sulfonic groups and phosphates are not used. Applicant further found that polar groups (which function as a Lewis Acid) on the molecule (such as the nitrile groups in polyacrylonitrile copolymers occurring in the many acrylic textiles available commercially) are especially useful as substrates for both the basic fluorescent dye and TMAE.

It is proposed that the fluorescent rhodamine dye, depicted below, when subjected to a polar environment or an environment of relative permittivity greater than 3 and less than 96, which environment tends to act as a weak electrolyte, undergoes ionic dissociation. Due to the environment just described, it is believed that the fluorescent ion formed is promoted and stabilized as diagrammatically shown below.

A Proposed Mechanism for Rhodamine Fluorescent Dye Discoloration and Restoration

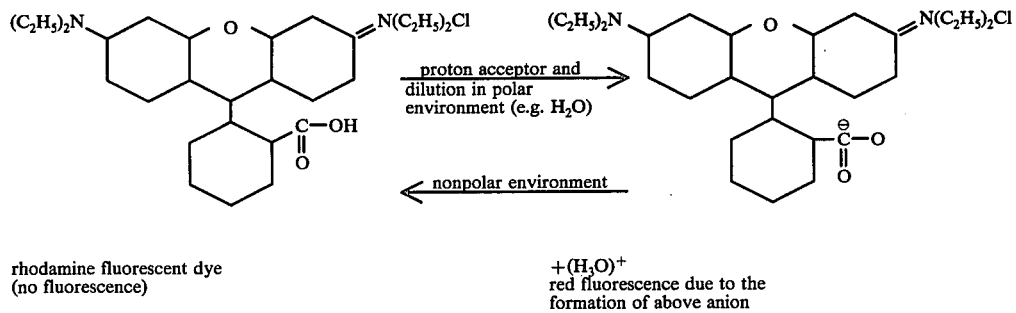

rhodamine fluorescent dye
(no fluorescence)

$+(H_3O)^+$
red fluorescence due to the formation of above anion

It is believed that the other operative dye components mentioned in this disclosure function in a similar chemical manner to that depicted above.

The most efficient embodiment of the invention consists essentially of a selected substrate to which a selected fluorescent dye has been first applied, followed by a later application of tetraaminoethylene (TAE). For best results, the tetraaminoethylene should be lightly applied in the form of a light film to the fluorescent dye impregnated substrate. In explanation, as the tetraaminoethylene, fluorescent coated substrate is exposed to air or oxygen, the resulting oxychemiluminescence takes place on the surface of the tetraaminoethylene. If the tetraaminoethylene coating or impregnation is heavy, then the chemiluminescence of the TAE will be at a greater distance from the fluorescent substrate and therefore less light energy will be absorbed by the fluorescent substrate. This will result in less of the blue-green chemiluminescent radiation being converted to the reds or oranges, and allowing proportionally more of the blue-green radiation to leave the substrate unconverted to yellow, orange, or red radiation.

In U.S. Pat. No. 3,264,221, Example III, Mr. Hilmer E. Winberg discloses a means for light measurements which could be employed to ascertain the optimum quantity of tetraaminoethylene to be applied to the already-coated-with-fluorescent-dye substrate for the maximum conversion of the violet-green-blue radiation due to the oxychemiluminescence of tetraaminoethylene.

The amount of chemiluminescent light energy absorbed by the fluorescent-coated substrate varies inversely as the square of the distance between the substrate and the surface of the tetraaminoethylene coating. Where more light output of the tetraaminoethylene formulation is desired and some color conversion may be sacrificed, then a thicker layer of TMAE should be impregnated on the fluorescent-coated substrate.

The present invention will now be described by reference to the following examples:

EXAMPLE 1

An orange colored chemiluminescent panel marker was fabricated by preparing the substrate in the following manner:

A 3¼ inches × 2¼ inches commercial white glass paper (fibers of glass pressed into a continuous sheet of glass) having a 0.010 inch thickness was spray coated uniformly with an aqueous suspension of a commercial fluorescent pigment (Forty grams of the foregoing commercial fluorescent pigment are added slowly with stirring to sixty grams of ethyl alcohol. Twenty grams of Class A sodium silicate liquid in accord with Federal Specification Number OS-605A having a specific gravity of 1.3 are stirred well with four hundred grams of distilled water and filtered. The resulting filtrate is then stirred well as the pigment-ethyl alcohol is added to form the foregoing aqueous suspension of the commercial fluorescent pigment.) which was prepared as per the product of example 13 of U.S. Pat. No. 2,938,873.

The sprayed substrate was allowed to dry at room temperature and then very mildly oven dried at 60° C. until only a trace of moisture remained for the stabilization of the orange pigment. The substrate was then placed in a transparent nylon film envelope and impregnated in an oxygen-free ambience with 1.5 cc. of a 50/50 mixture of TMAE and dimethyl silicone oil as an oxidation moderator. The envelope was heat sealed to prevent the entry of oxygen and/or air. Upon opening the panel marker in air the panel emitted a bright orange light. No fading of color was observed on storage of this item.

EXAMPLE 2

A free-from-halogens commercial polyacrylonitrile cloth (Orlon, Creslan which has a dielectric constant in the range of 5 to 6) was dyed with a commercial rhodamine red dye (C.I. Constitution No. 45165) and scoured. It was then cut into two 12 inches × 18 inches areas. Both places were placed together in a transparent nylon envelope. The red cloth substrate was then impregnated with 60 cc. of TMAE in an oxygen-free surrounding and the envelope was heat sealed to prevent oxygen exposure. It was then stored in an 80° C. oven for a period of one week to check stability and removed. No discoloration of the colored cloth was observed. Upon opening and exposing to air a bright red light was emitted. Upon washing the cloth with water, it was found that the cloth could be reused.

EXAMPLE 3

Two 6 inches × 9 inches pieces of Creslan cloth (polyacrylonitrile/acrylic copolymer were dyed with 2% Atacryl Brilliant Red 4 G (Atlantic Chemical Corp., Nutley, N.J., Basic Red 14 in Color Index). Both pieces were placed together in a transparent nylon envelope with 30 grams of the solid chemiluminescent compound tetrakis (N-pyrrolidinyl) ethylene (TPE) and heat sealed in an oxygen-free atmosphere.

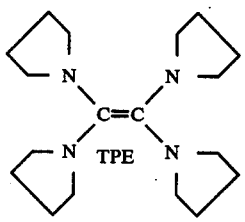

The envelope was heated to 80° C. to melt and uniformly distribute the TPE throughout the cloth substrate. Heating was continued for seven days to check stability. No discoloration of the colored cloth was observed. Upon opening and exposing to the air a bright red light was emitted.

EXAMPLE 4

50 grams of nylon flock (cloth fibers) were dyed with a commercial rhodamine orange dye (C.I. Constitution No. 45160). 20 grams of a 50/50 mixture by weight of 1,1',3,3'-tetraethylΔ2,2'-bi(imidazolidine) (TEIA)

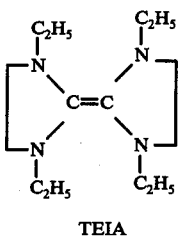

TEIA and mineral oil were uniformly blended in an oxygen free atmosphere and placed into an air-tight screw-capped glass jar. The jar and contents were heated at 70° C. for five days to test the stability. At the end of this period the contents showed no visible discoloration. Upon opening the jar the composition inside emitted a bright orange glow.

EXAMPLE 5

A diagrammatic sketch of one structural version of the invention is as follows:

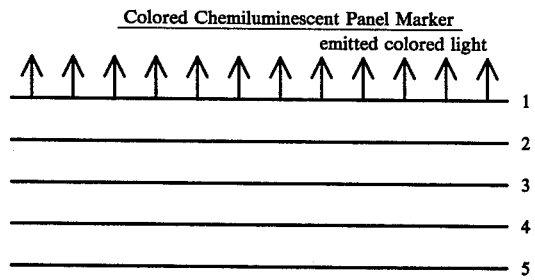

Layers 1 and 5 are nylon or Scotchpack outer envelope heat sealable material (transparent).

Layer 2 is a coarse nylon mesh material to act as a spacer between the outer envelope 1 and the chemiluminescent substrate layer 3. This is to provide air ventilation in the panel.

Layer 3 is a colored chemiluminescent substrate layer. This can be a cloth of high dielectric constant to which a fluorescent rhodamine dye has been first uniformly applied and then impregnated with a tetraaminoethylene, a chemiluminescent compound.

Layer 4 is an aluminum foil as a light reflector.

Since obvious modifications and equivalents in the invention will be evident to those skilled in the chemical arts, I propose to be bound solely by the appended claims.

The embodiments of the invention in which an exclusive property or privilege is claimed are defined as follows:

1. An improved process of generating visible light of yellow, orange, or red color from the blue-green visible light produced by the reaction of a tetraaminoethylene with oxygen wherein the improvement comprises first uniformly applying a fluorescent dye on a substrate and then uniformly applying the tetraaminoethylene on the substrate.

2. The process of claim 1 wherein the tetraaminoethylene is selected from the group consisting of
tetrakis(dimethylamino)ethylene;
tetrakis N-(pyrrolidinyl)ethylene;
1,3'-diethyl-1',3-dimethyl-Δ2,2'-bi(imidazolidine);
1,1',3,3'-tetra-n-propyl-Δ2,2'-bi(imidazolidine);
1,1',3,3'-tetramethyl-Δ2,2'-bi(imidazolidine);
1,1',3,3'-tetramethyl-Δ2,2,'-bi(imidazolidine); and
1,1',3,3'-tetramethyl-Δ2,2'-bi(hexahydropyrimidine).

3. The process of claim 1 wherein the tetraaminoethylene is tetrakis(dimethylamino)ethylene.

4. The process of claim 1 wherein the tetraaminoethylene is tetrakis N-(pyrrolidinyl)ethylene.

5. The process of claim 1 wherein the tetraaminoethylene is 1,3'-diethyl-1',3-dimethyl-Δ2,2'-bi(imidazolidine).

6. The process of claim 1 wherein the tetraaminoethylene is 1,1',3.3'-tetra-n-propyl-Δ2,2'-bi(imidazolidine).

7. The process of claim 1 wherein the tetraaminoethylene is 1,1',3,3'-tetramethyl-Δ2,2'-bi(imidazolidine).

8. The process of claim 1 wherein the tetraaminoethylene is 1,1',3,3'-tetraethyl-Δ2,2'-bi(imidazolidine).

9. The process of claim 1 wherein the tetraaminoethylene is 1,1',3,3'-tetramethyl-Δ2,2'-bi(hexahydropyrimidine).

10. The process of claim 1 wherein the fluorescent dye is selected from the Methine and Polymethine group in the Colour Index consisting of 48010, 48013, 48035, 48040, 48070, 48015 and CI Basic Red 14 Chemical Class: Cyanine Bright Red (fluorescent).

11. The process of claim 1 wherein the fluorescent dye is selected from the group in the Color Index consisting of:

Rhodamine B, 45170B

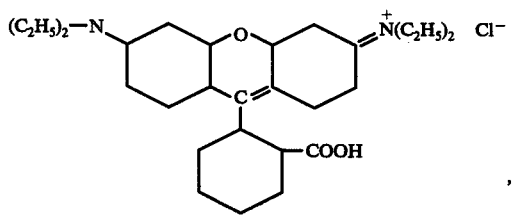

Rhodine 2 G, (SCI) 45165

-continued

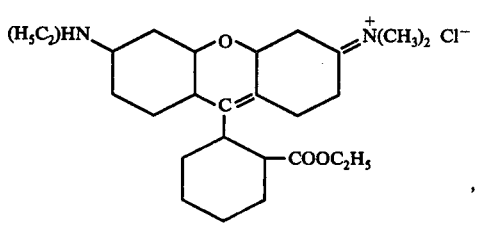

Rhodamine 4 G, (IG) 45166

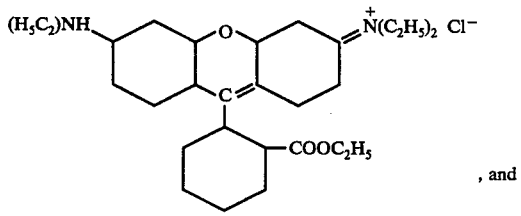

Rhodamin 6 G, 45160

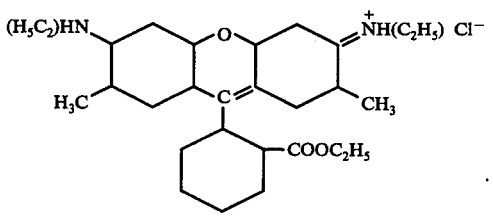

12. The process of claim 1 wherein the substrate is white glass paper.

13. The process of claim 1 wherein the substrate is a free-from-halogens polyacrylonitrile cloth.

14. The process of claim 13 wherein the fluorescent dye is rhodamine red dye, Rhodamine B 45170B.

15. The process of claim 1 wherein the substrate is nylon flock.

16. The process of claim 15 wherein the fluorescent dye is rhodamine orange dye (45165).

17. The process of claim 1 wherein the substrate is a free-from-halogens polyacrylonitrile/acrylic copolymer having a relative permittivity in excess of 3 and less than 6.1.

18. The process of claim 1 wherein the substrate is a white glass paper spray coated with an aqueous suspension of a commercial fluorescent pigment.

19. The process of claim 1 wherein the substrate is the polymeric substrate polyacrylonitrile.

20. The process of claim 1 wherein the substrate is a polymeric material substrate having a relative permittivity in excess of 3 and less than 96.

21. The process of claim 19 wherein the polymeric substrate is selected from the group consisting of polyacrylonitrile, polyamides, polyester, cellulose acetate, cellulose nitrate, cellulose propionate, polyacrylic ester, urea formaldehyde resin, vinyl polymer, vinyl copolymers, and physical mixtures from said group.

22. The process of claim 19 wherein the polymeric substrate is modified in chemical attachment of electrically polarizing radicals selected from the group consisting of nitrile, sulfonyl, nitro, nitrate, anhydride, carbonyl, ester, phosphate, amide, branched alkyl, amide, amine, hydrazino, alcohol and ether.

23. The process of claim 21 wherein the polymeric substrate is modified by chemical attachment of electrically polarizing radicals selected from the group consisting of nitrile, sulfonyl, nitro, nitrate, anhydride, carbonyl, ester, phosphate, amide, branched alkyl, amine, hydrazino, alcohol and ether.

* * * * *